US007228880B2

(12) United States Patent
Taillon

(10) Patent No.: US 7,228,880 B2
(45) Date of Patent: Jun. 12, 2007

(54) STABILIZING MECHANISM FOR A TREE-FELLING HEAD

(75) Inventor: Michel Taillon, St-Prime (CA)

(73) Assignee: Les Produits Gilbert, Inc., Quebec (CA)

( * ) Notice: Subject to any disclaimer, the term of this patent is extended or adjusted under 35 U.S.C. 154(b) by 0 days.

(21) Appl. No.: 11/143,324

(22) Filed: Jun. 2, 2005

(65) Prior Publication Data

US 2006/0272742 A1     Dec. 7, 2006

(51) Int. Cl.
*A01G 23/08*     (2006.01)
(52) U.S. Cl. .................... 144/4.1; 144/34.1; 144/24.12
(58) Field of Classification Search ................. 144/4.1, 144/34.1, 24.12, 335, 34.6, 336; 56/16.4 R, 56/16.8, 255; 83/821, 829, 928

See application file for complete search history.

(56) References Cited

U.S. PATENT DOCUMENTS

| 4,013,106 A | * | 3/1977 | Albright ..................... 144/34.1 |
| 4,932,447 A | * | 6/1990 | Morin ........................ 144/34.1 |
| 4,987,935 A | * | 1/1991 | Corcoran et al. ........... 144/34.1 |
| 5,113,919 A | * | 5/1992 | MacLennan ................ 144/34.1 |
| 5,369,886 A | * | 12/1994 | Gallatin ........................ 30/371 |
| 5,549,145 A | * | 8/1996 | Bearden ..................... 144/34.1 |
| 2004/0221921 A1 | * | 11/2004 | DiSabatino ................. 144/4.1 |

* cited by examiner

*Primary Examiner*—Bena Miller
(74) *Attorney, Agent, or Firm*—Myers, Bigel, Sibley & Sajovec, P.A.

(57) ABSTRACT

A stabilizing mechanism for the circular saw of a felling head is provided. The mechanism includes at least one gyroscopic stop disposed slightly above the saw on one of its sides in order to prevent the tilting of the saw in the opposite direction due to the gyroscopic effect when the saw is angled forward. Gyroscopic stops may be provided on each side of the saw and be combined with back stops extending over the rear extremity of the saw.

21 Claims, 4 Drawing Sheets

STABILIZING MECHANISM FOR A TREE-FELLING HEAD

FIELD OF THE INVENTION

The present invention generally relates to the cutting industry and more particularly concerns a stabilizing mechanism improving the performance of tree-felling heads.

BACKGROUND OF THE INVENTION

Tree-felling heads are well known devices installed at the end of a power operated boom carried by a forest-going vehicle. Felling heads are usually provided with a circular saw rotating in a generally horizontal plane for cutting the trees. Arms are provided for grabbing the tree being cut, and subsequently laying it on the ground. Multiple arms may be provided for accumulating a number of trees before putting them down. An example of such a felling head is shown in Canadian patent No. 2,038,784 (GILBERT).

Efforts are being made in the wood cutting industry to increase the cutting capacity of tree-felling heads. Such an increase is particularly significant in regions, such as Western Canada, where trees are wide, of irregular shape, heavy and measure over 100 feet. Standard tree-felling head having a cutting capacity of 24" often need to cut such trees in repetitive steps which increases operational hazards.

Obtaining a greater cutting capacity may be achieved by either increasing the saw diameter, or reducing the size of the surrounding cage ensuring its proper working. The latter option being difficult to contemplate without affecting the reliability of the system, increasing the diameter remains the better option. However, one important consequence of this expansion is the corresponding increase in the gyroscopic forces acting on the saw. For example, when the felling head is angled forward to put down the cut trees, the saw experiences a sideways tilting which puts heavy constraints on the saw's driving systems and interferes with its ability to resume the desired rotation speed quickly.

There is therefore a need for a mechanism allowing an increase of the diameter of the saw of a tree-felling head without unduly burdening its driving system.

SUMMARY OF THE INVENTION

Accordingly, the present invention provides a tree-felling head having a tree-engaging forward direction, including a circular saw having left and right sides with respect to this forward direction. The gyroscopic effect induces a sideways tilting of the saw when it is angled in the forward direction. The tree-felling head further includes a stabilizing mechanism which includes a gyroscopic stop extending slightly above the saw at a position over one of the left and right sides thereof. This position is selected so that the gyroscopic stop blocks the sideways tilting of the saw.

In cases where the saw rotates clockwise, the gyroscopic stop needs to be disposed on the left side. Conversely, when the saw has a counterclockwise rotation, the gyroscopic stop needs to be disposed on the right side. In accordance with a preferred embodiment of the invention, an additional gyroscopic stop may also be provided on the opposite side of the saw.

According to another aspect of the invention, there is also provided a stabilizing mechanism for a circular saw of a tree-felling head, the tree-felling head having a tree-engaging forward direction and the saw having left and right sides with respect to this forward direction. The stabilizing mechanism includes a gyroscopic stop extending slightly above the saw at a position over one of the left and right sides thereof, this position being selected so that the gyroscopic stop blocks the sideways tilting of the saw induced by the gyroscopic effect when the saw is angled in the forward direction.

Further features and aspects of the present invention will be better understood upon reading of preferred embodiments thereof with reference to the appended drawings.

DESCRIPTION OF A PREFERRED EMBODIMENT OF THE INVENTION

The present invention advantageously provides a stabilizing mechanism which controls the gyroscopic effect on the rotating saw of a tree-felling head.

Figure 1:
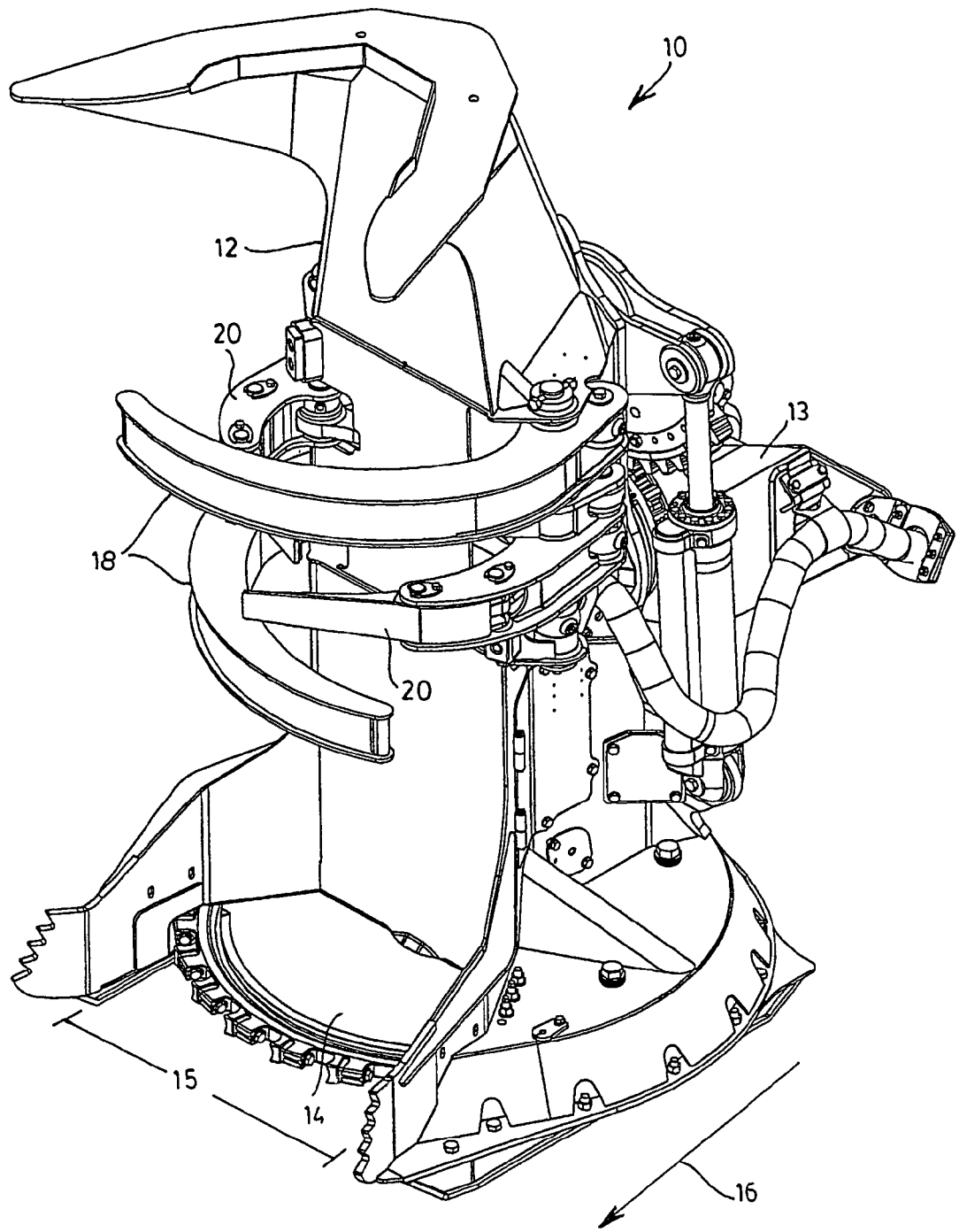
FIG. 1 is a perspective view of a tree-felling head according to an embodiment of the present invention.
Figure 2:
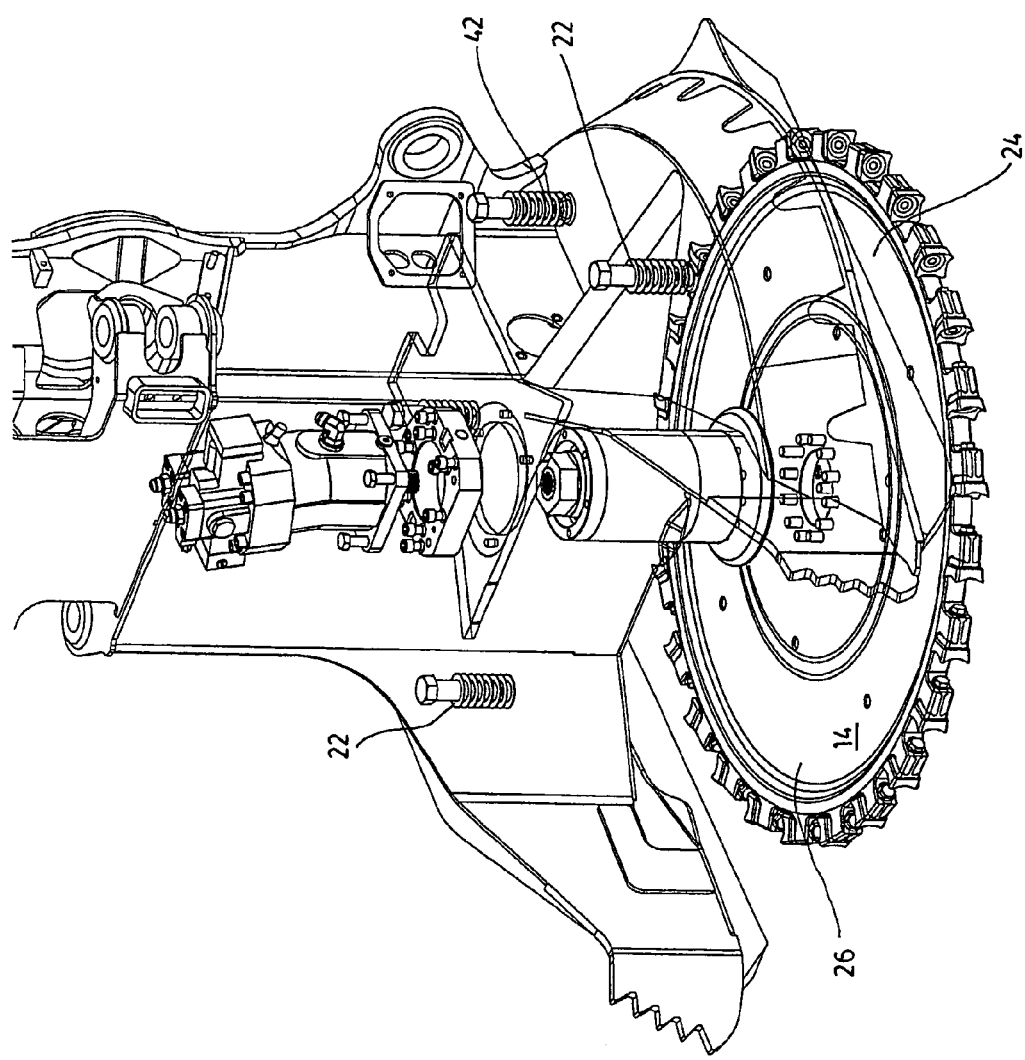
FIG. 2 is an exploded perspective view in partial transparency of the bottom portion of the felling head of FIG. 1.
Figure 3:
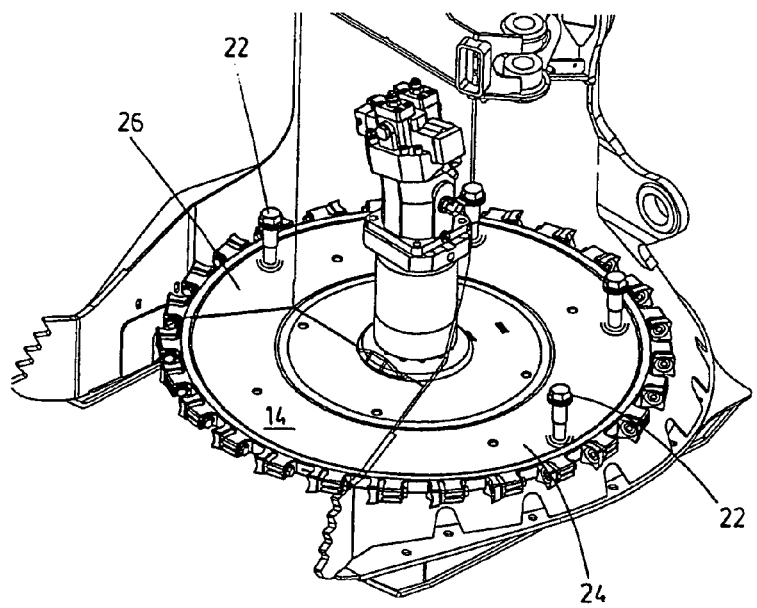
FIG. 3 is a perspective view in partial transparency of a saw provided with a stabilizing mechanism according to an embodiment of the invention.
Figure 4:
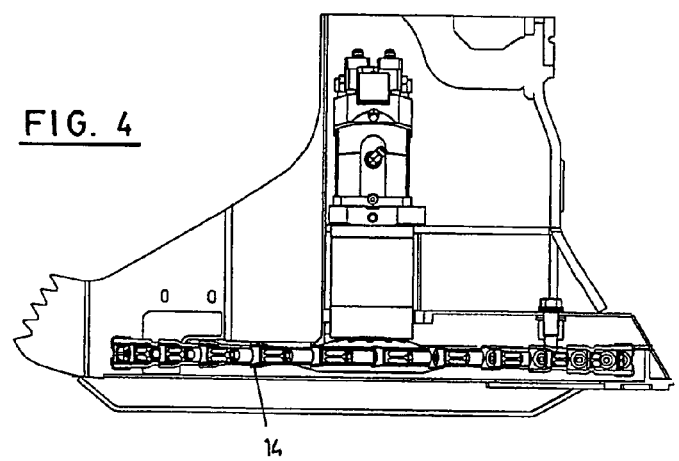
FIG. 4 is a side view of the saw of FIG. 3.
Figure 5:
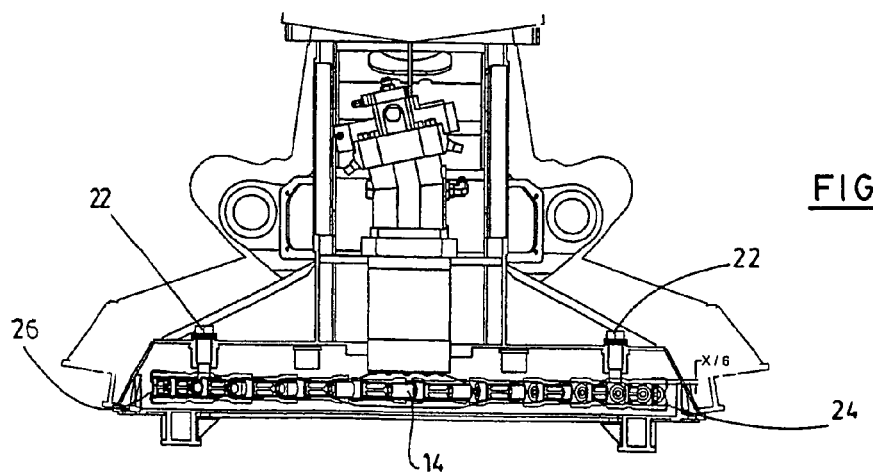
FIG. 5 is a front view of the saw of FIG. 3.
Figure 6:
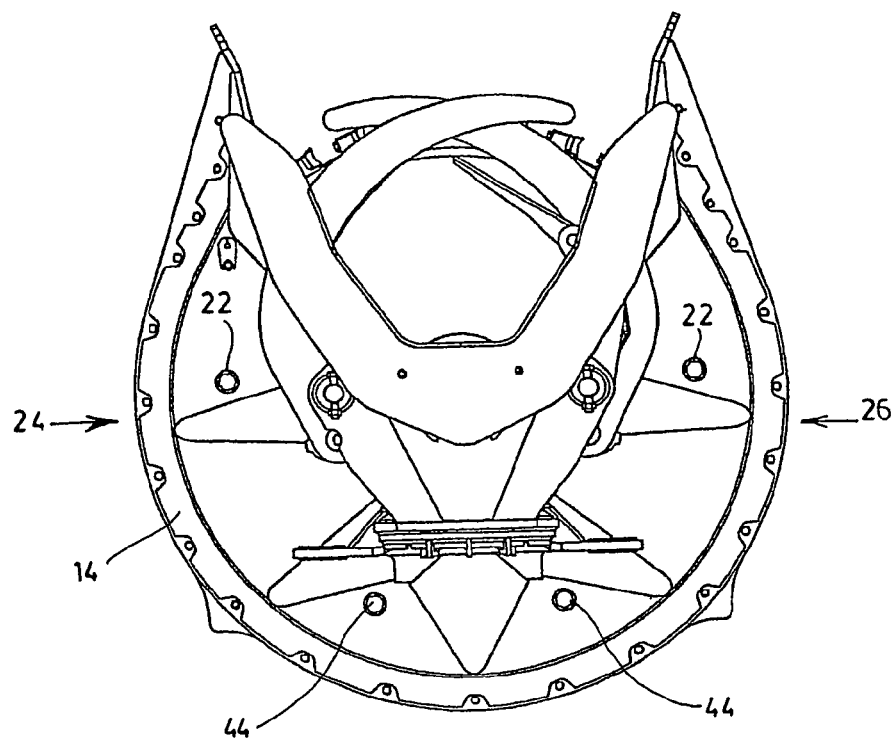
FIG. 6 is a top view of the saw of FIG. 3.

Referring to FIG. 1, there is shown a typical embodiment of a tree-felling head 10 to which the present invention is applied. The felling head 10 generally includes a frame 12 having a boom adapter 13 for attachment to an articulated boom (not shown). A circular saw 14 is rotationally mounted at the bottom end of the frame 12, and is designed to be operated in a generally horizontal plane when cutting. The crosswise length 15 of the portion of the saw 14 projecting from the frame 12 determines the cutting capacity of the saw, and the direction in which the apparatus moves in order to engage the trees is defined herein as the "forward direction" 16. Clamp arms 18 and accumulating arms 20 typically project forward from the upper portion of the frame 12 and are adapted to retain and accumulate the trees cut down by felling head 10. It will be understood by one skilled in the art that the tree-felling head of FIG. 1 is only one example of the type of apparatus to which the present invention pertains and that the invention is in no way limited to such an embodiment.

A rotating object, such as the circular saw of a felling head, has an angular momentum vector along its rotation axis, in a direction determined by physics' well known "right-hand rule". According to this convention, when wrapping the fingers of one's right hand around the direction of rotation of the object, the thumb sticks out in a direction corresponding to the angular momentum vector. Angular momentum being a conserved quantity, any rotating object tends to resist a change of direction of its angular momentum vector, such as created when its rotation axis is tilted from its original orientation, and tries to compensate by adding the necessary component to its new angular momentum. This creates a sideways tilting of the rotation plane, in a direction depending on the direction of rotation.

By way of example, let us suppose a circular saw as described above rotating counterclockwise in a horizontal plane. Using the right-hand rule, it can be seen that its angular momentum vector points upward. Now let us suppose that the saw in angled forward, therefore changing the direction of its angular momentum in the same direction. In order to bring it back in its original vertical direction, a rearward component is missing, which the system will try to add. Using again the right-hand rule, it can be seen that a rearward pointing angular momentum vector corresponds to a rotation of the saw around the rearward-forward axis, towards the left; the saw therefore tends to tilt downwardly on its left side.

Referring to FIGS. 2 to 7, in accordance with the present invention, there is s provided a stabilizing mechanism to control the gyroscopic effects described above. This mechanism includes a gyroscopic stop 22 extending slightly above the saw 14, at a position over either its left or right side 24 or 26, in order to block the sideways tilting of the saw 14. Following the reasoning above, it can be seen that if the saw 14 rotates counterclockwise, it will tend to tilt towards the left 24; the corresponding gyroscopic stop 22 will therefore be placed above the right side 26 of the saw 14. Similarly, for a clockwise rotating saw 14, the gyroscopic stop 22 will be placed above the left side 24. The "left" and "right" designations used herein are determined with respect to the forward direction 16 of the felling head, that is, from the point of view of its operator.

According to a preferred embodiment of the invention, an additional gyroscopic stop may be provided on the opposite side of the saw 22. For a saw rotating in a given direction, the second gyroscopic stop will prevent tilting under the gyroscopic effect when the saw is angled in the rearward direction, and generally increase stability.

It will be understood that the gyroscopic stops 22 need not be at a precise location on the corresponding side of the saw. In the illustrated embodiment, it can be seen that the gyroscopic stops 22 are generally located in alignment with the rotation axis 28 of the saw, at a right angle with the forward direction 16. The gyroscopic saw may however be displaced forward of backward, and the distance between the gyroscopic stops 22 and the edge of the saw may vary, as long as they are in a position to provide the leverage effect necessary to stop the tilting of the saw on its other side. In addition, more than one gyroscopic stop may be provided on one side of the saw in order to prevent its gyroscopic induced tilting.

The gyroscopic stops 22 extend above the saw 14 at a distance from its top surface sufficient to efficiently block the tilting of the saw without interfering with its general operation. In the preferred embodiment, this distance is of about 3,2 mm to 4,8 mm.

Figure 7:
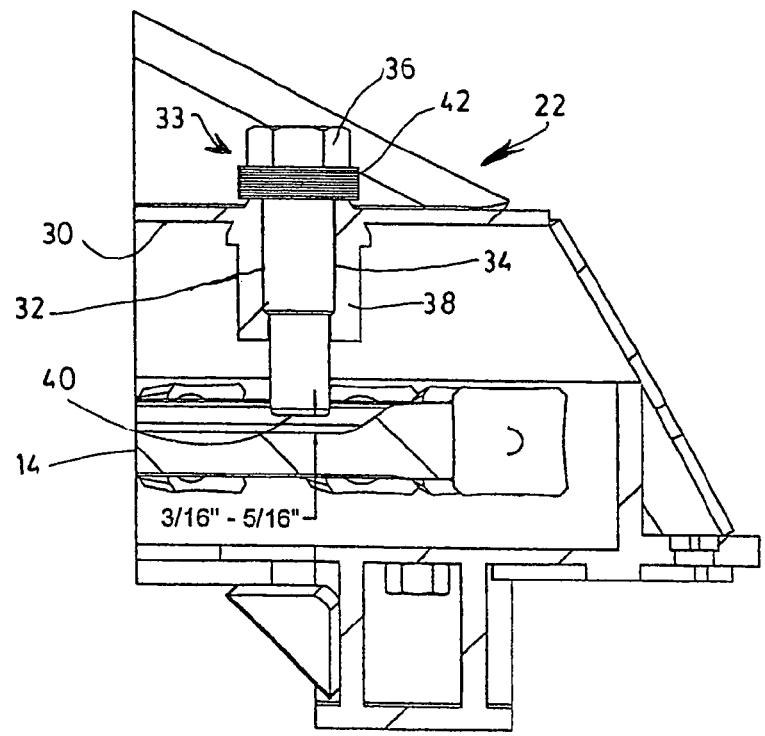
FIG. 7 is a cross-sectional side view of a stabilizing mechanism according to an aspect of the present invention.

Referring more particularly to FIG. 7, the construction of a gyroscopic stop according to a preferred embodiment of the invention is explained in more details.

Typical tree felling heads casings usually include a plate 30 which extends above the saw 14, generally in parallel therewith. In order to install the gyroscopic stops 22 of the present invention, the plate 30 is preferably provided with openings 32 therethrough, at locations directly over the positions where the gyroscopic stops 22 interact with the saw 14. Each gyroscopic stop is preferably embodied by a bolt 33, which has a threaded pin 34 extending through the corresponding opening 32, generally perpendicularly to the saw 14. The head 36 of the bolt abuts on the top surface of the plate 30. A threaded bore 38 is preferably rigidly affixed underneath the plate 30 in alignment with each opening 32, for example by welding. The pin 34 is threadedly engaged in the bore 38 so that the vertical movement of the bolt 33 is prevented. Alternatively, a nut could be threaded on the pin 34 underneath the plate 30 to maintain the bolt 33 into place.

It will be readily understood by one skilled in the art that the present invention is not limited to the particular form and mounting arrangement of the gyroscopic stops described above. The gyroscopic stops could take any other appropriate shape which would allow them to block the sideways tilting of the saw under the gyroscopic effect. Any appropriate part of the saw casing could be used to mount the gyroscopic stops instead of the plate described above, and additional components could be added for this purpose. In an alternate embodiment, the stops could be mounted from a side structure instead of from above.

The wear of the bottom of the pin 34 will constantly increase the distance between it and the surface of the saw. In order to keep this distance in the proper interval, such as from 3,2 mm to 4,8 mm as explained above, the gyroscopic stops 22 are preferably provided with one or more spacers 42 between the head 36 of the bolt and the top surface of the plate 30. These spacers 42 will initially raise the bolt 32 with respect to the saw. As the extremity 40 of the pin 34 is worn out, spacers may be gradually removed to lower the bolt 33, and consequently bring back the extremity 40 of the pin 34 within the desired distance interval from the saw 14. The spacer may be embodied by washers. Such spacers 42 are better seen in the exploded view of FIG. 2.

Referring back to FIGS. 2 and 6, it can be seen that the gyroscopic stops 22 according to the present invention may advantageously be used in combination with back stops 44 as are well known in the art. Back stops 44 are used to prevent damage to the saw 14 when it hits the ground, and are usually provided in pairs on the rearward portion of the saw 14 on each of its sides. It will be noted that the back stops 44 are used to prevent the saw from tilting forward on impact, and that their function has nothing to do with gyroscopic motion. As a matter of fact, the back stops 44 are positioned too far rearwardly of the saw to efficiently prevent its sideways tilting as with the gyroscopic stops of the present invention.

As will easily be appreciated by one skilled in the art, the provision of a stabilizing mechanism according to the present invention allows an increase of the diameter of the saw without putting undue constraints on its driving system. Industry standards currently use felling head saws having a maximum of 57 inches, with very few models going up to 60 inches, with a cutting capacity of 24 inches. With the present invention, the saw diameter has been successfully increased to 66 inches, providing a cutting capacity of 28 inches, a 16% increase on the closest prior art. Additionally, reducing the gyroscopic tilting of the saw has the advantage of improving its ability to resume its desired rotation speed quickly, as well as ensuring a better protection of the components of the felling head, particularly the saw itself and its surrounding frame. Finally, the stabilizing mechanism according to the present invention allows reducing the thickness of the saw, and therefore reducing its kerf. This further increases the cutting capacity of the felling head, as less material needs to be eliminated from the tree.

Of course, numerous modifications could be made to the embodiments above without departing from the scope of the present invention as defined in the appended claims.

The invention claim is:

1. A tree-felling head having a frame and a tree-engaging forward direction, comprising:

a center-driven disk saw having left and right sides with respect to said forward direction, said saw being rotatable within an operative rotation plane with respect to said frame, the gyroscopic effect inducing a sideways tilting of the saw with respect to said operative rotation plane when said saw is angled in the forward direction; and a stabilizing mechanism comprising a gyroscopic stop extending slightly above said saw without contact therewith when said saw rotates within said operative rotation plane, said gyroscopic stop extending at a position over one of said left and right sides of said saw, said position being selected so that the gyroscopic stop blocks said sideways tilting.

2. The tree-felling head according to claim 1, wherein said saw has a clockwise rotation direction, and the gyroscopic stop is positioned on the left side thereof.

3. The tree-felling head according to claim 1, wherein said saw has a counterclockwise rotation direction, and the gyroscopic stop is positioned on the right side thereof.

4. The tree-felling head according to claim 1, wherein the position of said gyroscopic stop is at a right angle with said forward direction, generally in alignment with a rotation axis of said saw.

5. The tree-felling head according to claim 1, further comprising a plate extending above said saw generally in parallel therewith, said plate having an opening therethrough.

6. The tree-feeling head according to claim 5, wherein said gyroscopic stop comprises:
a bolt having a threaded pin extending through said opening generally perpendicularly to said saw and a head abutting on top of said plate; and
a threaded bore affixed underneath said plate threadedly receiving said threaded pin therethrough.

7. The tree-felling head according to claim 6, wherein said threaded pin of the bolt has an extremity opposite said head of the bolt extending at a distance of the saw within an interval of 3,2 mm and 4,8 mm.

8. The tree-felling head according to claim 7, wherein said distance is adjustable.

9. The tree-felling head according to claim 8, wherein said gyroscopic stop further comprises at least one spacer removably disposed between the head of the bolt and the top surface of the plate for adjusting said distance.

10. The tree-felling head according to claim 1, wherein said stabilizing mechanism further comprises an additional gyroscopic stop extending slightly above said saw without contact therewith when said saw rotates within said operative rotation plane, said additional gyroscopic stop extending at a position over the other one of said left and right sides thereof.

11. The tree-felling head according to claim 10, wherein the position of each of said gyroscopic stops is at a right angle with said forward direction, generally in alignment with a rotation axis of the saw.

12. The tree-felling head according to claim 11, comprising at least one back stop extending slightly above said saw rearwardly of said gyroscopic stops.

13. The tree-felling head according to claim 12, wherein said at least one back stop includes a pair of back stops respectively positioned on the left and right sides of the saw.

14. The tree felling head according to claim 1, wherein said saw has a diameter of at least 66 inches.

15. A stabilizing mechanism for a center-driven disk saw of a tree-felling head, said tree-felling head having a frame and a tree-engaging forward direction and the saw having left and right sides with respect to said forward direction, said saw being rotatable within an operative rotation plane with respect to said frame, the stabilizing mechanism comprising:
a gyroscopic stop extending slightly above said saw without contact therewith when said saw rotates within said operative rotation plane, said gyroscopic stop extending at a position over one of said left and right sides thereof, said position being selected so that the gyroscopic stop blocks a sideways tilting of the saw with respect to said operative rotation plane induced by the gyroscopic effect when said saw is angled in the forward direction.

16. The stabilizing mechanism according to claim 15, wherein the position of said gyroscopic stop is at a right angle with said forward direction, generally in alignment with a rotation axis of said saw.

17. The stabilizing mechanism according to claim 15, comprising a bolt extending generally perpendicularly to said saw.

18. The stabilizing mechanism according to claim 17, wherein said bolt has an extremity extending at a distance of the saw within an interval of 3,2 mm and 4,8 mm.

19. The stabilizing mechanism according to claim 18, wherein said distance is adjustable.

20. The stabilizing mechanism according to claim 15, further comprising an additional gyroscopic stop extending slightly above said saw without contact therewith when said saw rotates within said operative rotation plane said additional gyroscopic stop extending at a position over the other one of said left and right sides thereof.

21. The stabilizing mechanism according to claim 20, wherein the position of each of said gyroscopic stops is at a right angle with said forward direction, generally in alignment with a rotation axis of the saw.

* * * * *